(12) United States Patent
Kostakis et al.

(10) Patent No.: US 9,231,399 B2
(45) Date of Patent: Jan. 5, 2016

(54) DEVICES AND METHODS FOR OVERVOLTAGE PROTECTION

(75) Inventors: Grigoris Kostakis, Athens (GR); Evaggelia Giannelaki, Drama (GR); Thomas Tsovilis, Drama (GR); Zafiris Politis, Athens (GR); Konstantinos Samaras, Athens (GR)

(73) Assignee: Raycap Intellectual Property Ltd., Nicosia (CY)

(*) Notice: Subject to any disclaimer, the term of this patent is extended or adjusted under 35 U.S.C. 154(b) by 287 days.

(21) Appl. No.: 13/595,092

(22) Filed: Aug. 27, 2012

(65) Prior Publication Data

US 2014/0055898 A1 Feb. 27, 2014

(30) Foreign Application Priority Data

Aug. 22, 2012 (GR) .................................. 120100429

(51) Int. Cl.
| | |
|---|---|
| H02H 3/20 | (2006.01) |
| H02H 9/04 | (2006.01) |
| H02H 3/02 | (2006.01) |
| H02H 3/08 | (2006.01) |
| H02H 3/10 | (2006.01) |
| H02H 7/22 | (2006.01) |
| H02H 3/22 | (2006.01) |
| H02H 9/00 | (2006.01) |

(52) U.S. Cl.
CPC .................. *H02H 3/20* (2013.01); *H02H 3/025* (2013.01); *H02H 3/08* (2013.01); *H02H 3/10* (2013.01); *H02H 7/22* (2013.01); *H02H 9/04* (2013.01)

(58) Field of Classification Search
CPC .............. H02H 3/20; H02H 3/22; H02H 9/04
USPC ............................................ 361/111, 91.1, 56
See application file for complete search history.

(56) References Cited

U.S. PATENT DOCUMENTS

| | | | | |
|---|---|---|---|---|
| 5,283,709 | A | * | 2/1994 | Shirakawa et al. ............ 361/117 |
| 6,927,958 | B2 | * | 8/2005 | Nostrand ......................... 361/58 |
| 8,035,258 | B2 | * | 10/2011 | Hyde et al. .................... 307/149 |
| 2008/0247105 | A1 | | 10/2008 | Divan |
| 2013/0100710 | A1 | * | 4/2013 | Kang et al. ................. 363/21.12 |

FOREIGN PATENT DOCUMENTS

| | | |
|---|---|---|
| EP | 0 495 142 A1 | 7/1992 |
| WO | WO 97/18612 A1 | 5/1997 |
| WO | WO 03/058790 A1 | 7/2003 |

OTHER PUBLICATIONS

European Search Report Corresponding to European Patent Application No. 12182039.3-1806; Dated: Jul. 29, 2013; 7 Pages.

* cited by examiner

*Primary Examiner* — Thienvu Tran
*Assistant Examiner* — Lucy Thomas
(74) *Attorney, Agent, or Firm* — Myers Bigel Sibley & Sajovec, P.A.

(57) ABSTRACT

A circuit protection device includes an overvoltage monitor circuit that is operable to monitor a power supply circuit to detect an overvoltage condition on the power supply circuit and to change a state of an overvoltage output responsive to the overvoltage condition on the power supply circuit. A bi-directional switch is operable to interrupt or limit current flow though the power supply circuit responsive to the change in the state of the overvoltage output. A bi-directional voltage limiter is connected across output terminals of the circuit protection device and is operable to limit an overvoltage to a predefined voltage limit.

19 Claims, 13 Drawing Sheets

DEVICES AND METHODS FOR OVERVOLTAGE PROTECTION

CROSS REFERENCE TO RELATED APPLICATIONS

This U.S. non-provisional patent application claims the benefit of priority under 35 U.S.C. §119 of Greek Patent Application 20120100429, filed Aug. 22, 2012, the entire disclosure of which is hereby incorporated herein by reference in its entirety.

FIELD OF THE INVENTION

The present invention relates to circuit protection devices and, more particularly, to overvoltage protection devices and methods.

BACKGROUND

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges and resulting down time may be very costly.

Typically, sensitive electronic equipment may be protected against transient overvoltages and surge currents using Surge Protective Devices (SPDs). For example, brief reference is made to FIG. 1, which is a system including conventional overvoltage and surge protection. An overvoltage protection device 10 may be installed at a power input of equipment to be protected 50. The overvoltage protection device 10 may include a surge protection device 12. When a surge current $I_{surge}$ flows towards the equipment 50, the surge protection device 12 may conduct a portion thereof ($I_{SPD}$), leaving a surge current portion $I_{EQ}$ that flows through the equipment 50.

However, there are applications where the immunity level of the sensitive electronic equipment to be protected against transient overvoltages and surge currents is very low. In such cases, the residual voltage of the SPD ($V_{SPD}$) or the portion of the surge current that flows to the electronic equipment ($I_{Eq}$) may exceed the immunity level (resistibility) of the equipment to overvoltages and/or surge currents and may result in damage thereto.

SUMMARY

According to embodiments of the present invention, a circuit protection (surge voltage limiting) device may be provided. The circuit protection device may include an overvoltage monitor circuit that is operable to monitor a power supply circuit to detect an overvoltage condition on the power supply circuit and to change a state of an overvoltage output responsive to the overvoltage condition on the power supply circuit. A bi-directional switch may be operable to interrupt or limit current flow though the power supply circuit to the equipment and the bi-directional voltage limiter responsive to the change in the state of the overvoltage output and a bi-directional voltage limiter connected across output terminals of the circuit protection device may be operable to limit an overvoltage to a predefined voltage limit.

In some embodiments, the bi-directional switch includes a first switch that is closed in the absence of the overvoltage condition and that is operable to change to open responsive to a positive overvoltage condition and a second switch that is in series with the first switch and that is closed in the absence of the overvoltage condition and that is operable to change to open responsive to a negative overvoltage condition.

Some embodiments provide that the first and second switches each include multiple solid state switches that are arranged in parallel with one another.

Some embodiments include a resistor that is electrically connected across the first and/or the second switch and that is operable to conduct current when the second switch is open.

In some embodiments, the overvoltage monitor circuit includes a first overvoltage monitor circuit that is operable to monitor the power supply circuit to detect a positive overvoltage condition on the power supply circuit or a change in the voltage polarity at the ends of a switch or the voltage across a series inductance and to change a first overvoltage output responsive to the positive overvoltage condition on the power supply circuit. The overvoltage monitor circuit may further include a second overvoltage monitor circuit that is operable to monitor the power supply circuit to detect a negative overvoltage condition on the power supply circuit or a change in the voltage polarity across a switch or the voltage across a series inductance and to change a second overvoltage output responsive to the negative overvoltage condition on the power supply circuit.

Some embodiments provide that the first switch is operable to open responsive to the first overvoltage output from the first overvoltage monitor circuit and the second switch is operable to open responsive to the second overvoltage output from the second overvoltage monitor circuit.

In some embodiments, the first overvoltage monitor circuit includes a voltage input circuit that is operable to receive a voltage input signal and to generate a first translated voltage signal that is a function of the voltage input signal. The first overvoltage monitor circuit may further include at least one transistor driver circuit that is operable to receive a voltage reference and the first translated voltage signal and to change the first overvoltage output responsive to a comparison of the first translated voltage signal to the voltage reference.

Some embodiments provide that the second overvoltage monitor circuit includes a voltage input circuit that is operable to receive the voltage input signal and to generate a second translated voltage signal that is a function of the voltage input signal. The second overvoltage monitor circuit may further include at least one transistor driver circuit that is operable to receive the voltage reference and the second translated voltage signal and to change the second overvoltage output responsive to a comparison of the second translated voltage signal to the voltage reference.

Some embodiments include a bias power supply that is coupled to the power supply circuit and that is operable to generate a bias voltage for the overvoltage monitor circuit.

In some embodiments, the bi-directional voltage limiter includes a rectifier circuit that includes inputs that are coupled to output terminals of the circuit protection device and outputs that are coupled to a power voltage limiter. The power voltage limiter may include a voltage regulator that is coupled to a semiconductor switch and a resistor. In some embodiments, the voltage regulator is operable to cause the semiconductor switch to conduct current when an input voltage at the output terminals of the rectifier circuit exceed a regulated voltage corresponding to the predefined voltage limit.

Some embodiments include a secondary surge protector that includes a first terminal that is coupled to a first input terminal of the circuit protection device and an inductor that includes a first terminal that is connected to a second terminal of the circuit protection device. In some embodiments, a second terminal of the secondary surge protector is coupled to a second terminal of the inductor.

Some embodiments provide that first and second inputs that are coupled to outputs from a primary surge protector.

In some embodiments, the circuit protection device comprises an overvoltage protector configured between a power supply and a tower mounted device. The overvoltage protector may further include a primary surge protector that is electrically coupled to a power cable that is between a tower mounted electrical device and the power supply.

In some embodiments, the overvoltage protector comprises a base overvoltage protector that is electrically coupled between the power supply and the power cable and the primary surge protector is electrically coupled between the power cable and the power supply.

Some embodiments provide that the overvoltage protector comprises a tower mounted overvoltage protector that is electrically coupled between the power cable and the tower mounted electrical device.

In some embodiments, the primary surge protector includes a metal oxide varistor.

Some embodiments of the present invention include a method for providing overvoltage protection. Operations according to the method include providing an overvoltage protection device. The overvoltage protection device includes a first overvoltage monitor circuit that is operable to monitor a power supply circuit to detect a positive overvoltage condition on the power supply circuit or the voltage across a switch or series inductance and to change a first overvoltage output responsive to the positive overvoltage condition on the power supply circuit and a second overvoltage monitor circuit that is operable to monitor the power supply circuit or the voltage across a switch or a series inductance to detect a negative overvoltage condition on the power supply circuit and to change a second overvoltage output responsive to the negative overvoltage condition on the power supply circuit. A bi-directional switch may include a first switch that is closed in the absence of the overvoltage condition and that may be operable to change to open responsive to a positive overvoltage condition and a second switch that is in series with the first switch and that is closed in the absence of the overvoltage condition and that may be operable to change to open responsive to a negative overvoltage condition. A resistor may be electrically connected across the first switch and/or the second switch and may be operable to conduct current when the second switch is open. The overvoltage protection device may further include a bi-directional voltage limiter that is connected across output terminals of the overvoltage protection device and that comprises a rectifier circuit that includes inputs that are coupled to output terminals of the circuit protection device and outputs that are coupled to a power voltage limiter, the power voltage limiter including a voltage regulator that is coupled to a semiconductor switch and a resistor.

Some embodiments provide that the overvoltage protection device includes a bias power supply that is coupled to the power supply circuit and that is operable to generate a bias voltage for the overvoltage monitor circuit.

Some embodiments of the present invention include an overvoltage protection device that includes a first overvoltage monitor circuit that is operable to monitor a power supply circuit to detect a positive overvoltage condition on the power supply circuit and to change a first overvoltage output responsive to the positive overvoltage condition on the power supply circuit and a second overvoltage monitor circuit that is operable to monitor the power supply circuit to detect a negative overvoltage condition on the power supply circuit and to change a second overvoltage output responsive to the negative overvoltage condition on the power supply circuit.

The device may further include a bi-directional switch that includes a first switch that is closed in the absence of the overvoltage condition and that is operable to change to open responsive to a positive overvoltage condition and a second switch that is in series with the first switch and that is closed in the absence of the overvoltage condition and that is operable to change to open responsive to a negative overvoltage condition. Some embodiments include a resistor that is electrically connected across the second switch, the resistor operable to conduct current when the second switch is open and a bi-directional voltage limiter that is connected across output terminals of the overvoltage protection device and that comprises a rectifier circuit that includes inputs that are coupled to output terminals of the circuit protection device and outputs that are coupled to a power voltage limiter, the power voltage limiter including a voltage regulator that is coupled to a semiconductor switch and a resistor.

Some embodiments include a secondary surge protector that includes a first terminal that is coupled to a first input terminal of the overvoltage protection device and an inductor that includes a first terminal that is connected to a second input terminal of the overvoltage protection device. Some embodiments provide that a second terminal of the secondary surge protector is coupled to a second terminal of the inductor.

In some embodiments, the first and second input terminals of the overvoltage protection are connected to a primary surge protector that is electrically coupled to a power cable.

Some embodiments of the present invention include systems for providing overvoltage protection. According to some embodiments, such systems may include a first surge voltage limiter that includes a first surge protected node that is electrically coupled to a power supply, a first primary surge protector that is electrically coupled to the first surge voltage limiter and to a proximal end of a power cable that is operable to transmit power from the power supply to an electrical load device, a second primary surge protector that is electrically coupled to a distal end of the power cable, and a second surge voltage limiter that is electrically coupled to the second primary surge protector and that includes a second surge protected node that is electrically coupled to the electrical load device.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION

Figure 1:
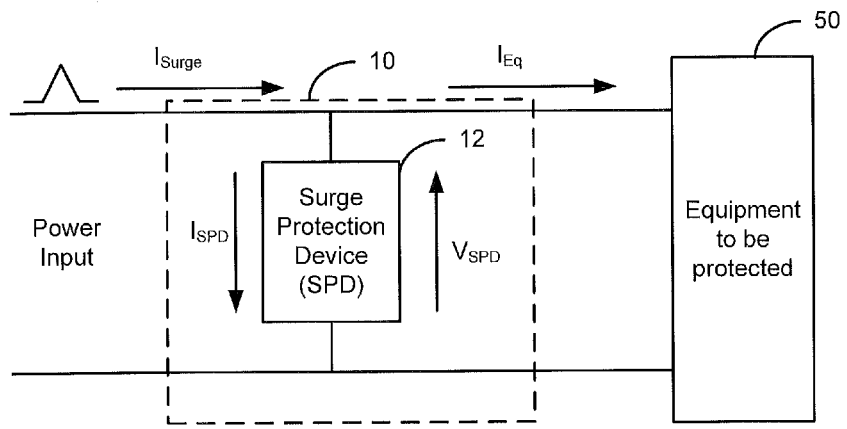
FIG. 1 is a block diagram of a system including conventional surge protection.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
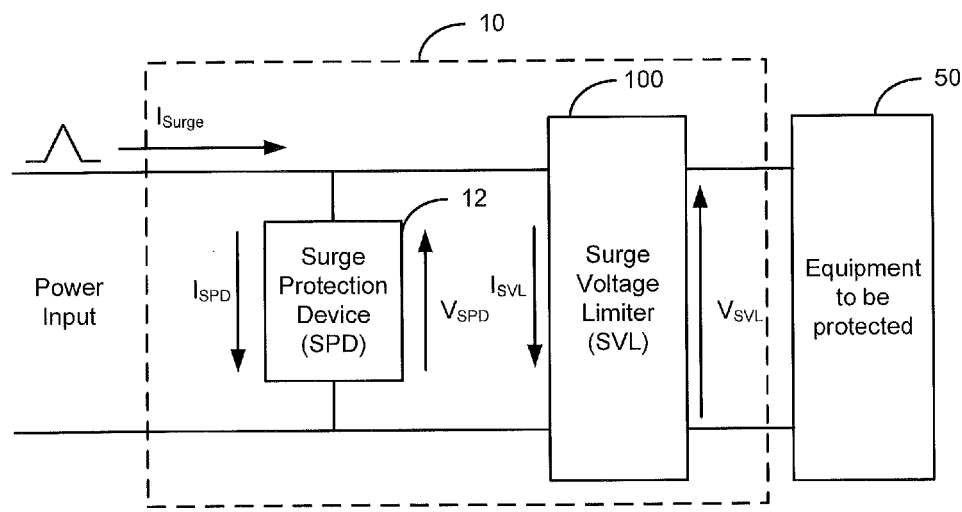
FIG. 2 is a block diagram illustrating overvoltage protection of equipment according to some embodiments of the present invention.

Reference is now made to FIG. 2, which is a block diagram illustrating overvoltage protection of equipment according to some embodiments of the present invention. Some embodiments of the present invention may be applicable to the protection of equipment corresponding to distributed antenna systems, however, such embodiments are non-limiting. For example, overvoltage protections devices and surge voltage limiters described herein may be application to many different types of systems that may be susceptible to overvoltage conditions and/or surge currents. An overvoltage protection device 10 may be installed at a power input of equipment to be protected 50. The overvoltage protection device 10 may include a surge protection device (SPD) 12 and a surge voltage limiter (SVL) 100. When a surge current $I_{surge}$ flows towards the equipment 50, the surge protection device 12 may conduct a portion thereof ($I_{SPD}$), leaving a surge current portion that may be further limited by the SVL 100. In this manner, the SVL 100 may limit the voltage $V_{SVL}$ and thus the current that flows through the equipment 50. The SVL 100 may be installed between the equipment to be protected 50 and the SPD 12.

In use and operation, the SVL 100 may reduce the SPD's residual voltage seen by the equipment 50 during transient/surge/lightning events to predefined acceptable levels. In addition, the SVL 100 may reduce the surge current that flows towards the equipment 50 to acceptable operational current range of the equipment. Some embodiments herein are presented in the context of surge protection of antenna mounted equipment and a base power supply that is operable to power the antenna, however, such examples are merely for explanation and are not limiting. For example, the overvoltage protection methods, systems and apparatus as discussed herein, may be used to protect a variety of different types and configurations of equipment that may benefit from such protection. Additionally, some embodiments herein are presented in the context of a direct current (DC) circuit, however, the methods, systems and apparatus disclosed herein are not so limited. For example, the invention disclosed herein may be implemented in an alternating current (AC) circuit and/or a DC circuit.

Figure 3:
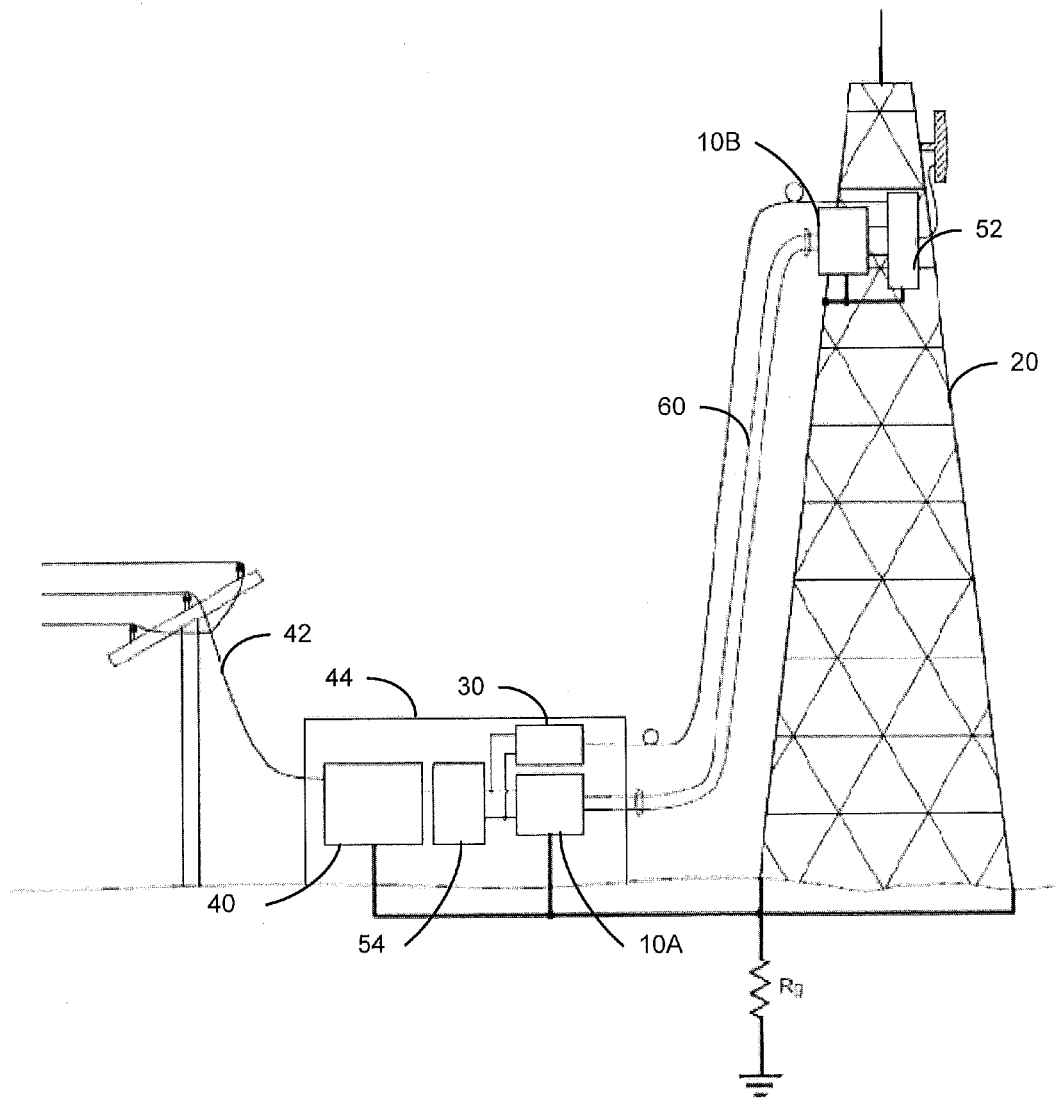
FIG. 3 is a side view illustrating a base and tower including overvoltage protection according to some embodiments of the present invention.

As discussed above, an SVL 100 may implemented in a system corresponding to tower mounted electrical equipment. For example, reference is now made to FIG. 3, which is a side view illustrating a base 44 and tower 20 including overvoltage protection according to some embodiments of the present invention. As illustrated, surge protection, such as protection from lighting strikes, among others, may be achieved by installing overvoltage protection devices 10A and 10B at both ends of a power cable 60 feeding the tower mounted equipment 52 from a power supply 54 located at the base 44. Although illustrated as proximate the tower 20, the base 44 may be several or many yards or miles away from the tower 20.

An AC power line 42 may provide AC power to the system via an AC surge protection device 40, which is configured to provide power to a power supply 54. A base located overvoltage protection device 10A may protect the power supply 54 from voltage/current surges that may occur along the power cable 60. Additionally, in some embodiments the tower mounted equipment 52 is a remote radio head (RRH) and the base 44 includes a base band unit 30. Each of the AC surge protection 40, the overvoltage protection device 10A and the tower 20 may be connected to an earth ground having a ground resistance $R_g$.

Figure 4:
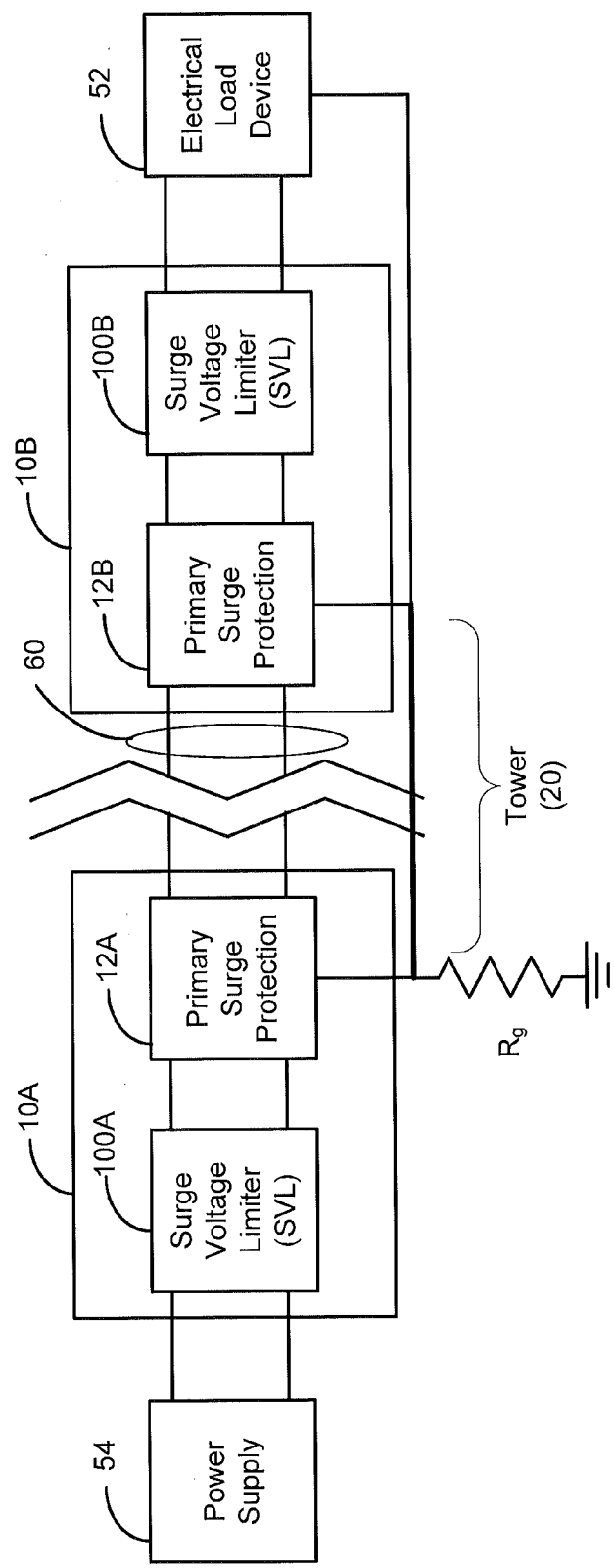
FIG. 4 is a block diagram illustrating a system including overvoltage protection according to some embodiments of the present invention.

Reference is now made to FIG. 4, which is a block diagram illustrating a system including overvoltage protection according to some embodiments of the present invention. Overvoltage protection devices 10A and 10B may be connected to one another via a power cable 60 and may provide overvoltage protection to a power supply 54 and an electrical load device 52, respectively. For example, overvoltage protection device 10A may be connected between the power supply 54 and the power cable 60. Similarly, overvoltage protection device 10B may be connected between the electrical load device 52 and the power cable 60. In this manner, if the power cable 60 is subjected to a surge current, both the power supply 54 and the electrical load device 52 may be protected from voltage levels that exceed their respective specifications and/or tolerances. Each of the overvoltage protection devices 10A and 10B may include primary surge protection 12A and 12B, respectively, and SVLs 100A and 100B, respectively.

Figure 5:
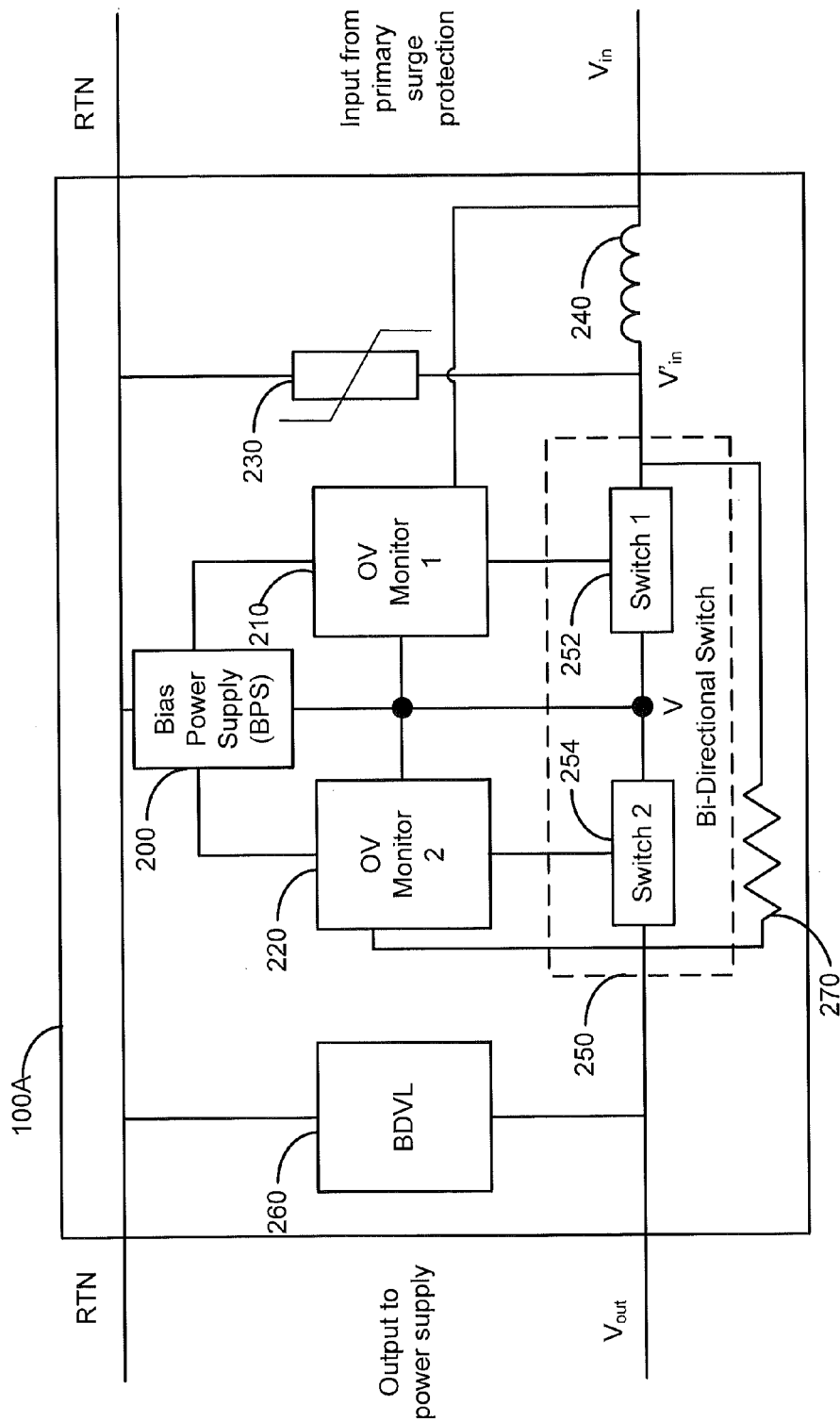
FIG. 5 is a block diagram illustrating a surge voltage limiter configured for a base installation according to some embodiments of the present invention.

Brief reference is made to FIG. 5, which is a block diagram illustrating a SVL 100A configured for a base installation according to some embodiments of the present invention. As discussed above regarding FIG. 4, an SVL 100A that is configured for a base installation may be installed between the primary surge protection 12A and a power supply 54. As such, the terms input and output when used in the context of an SVL 100A may refer to the receiving point corresponding to a surge and not to an input of normal power. As used herein the input power terminals may correspond to an input voltage line ($V_{in}$) and a return line (RTN) and output terminals may correspond to an output voltage line ($V_{out}$) and RTN. One of ordinary skill in the art will realize that such designations are non-limiting and represent labels to distinguish one power line from another power line. In this regard, the power lines may be AC or DC power lines and may be provided at any one of multiple different voltage levels, including, for example + or −48 VDC, among others. For example, the voltage levels may be any AC or positive or negative DC voltage between 12 and 1000 volts in accordance with some embodiments herein.

The SVL 100A may include an inductance 240 installed in series with $V_{in}$ on the input side of the SVL 100A. Some embodiments provide that the inductance 240 may provide coordination between primary and secondary protection. A secondary surge protector 230 may be connected between RTN of the input power and the other terminal of the inductance.

A bi-directional switch 250 may be coupled to the node common to the inductance 240 and the secondary surge protector 230 and to $V_{out}$. The bi-directional switch 250 includes switch 1 252 and switch 2 254, which are connected in series between the secondary surge protector 230 and to $V_{out}$. Each of the switches 252, 254 may be controlled by a separate overvoltage monitor (OV monitor) 210, 220. For example, switch 1 252 may be controlled by OV monitor 1 210 and switch 2 254 may be controlled by OV monitor 2 220. Each of the OV monitors 210, 220 may be powered by a bias power supply (BPS) 200. As illustrated, OV monitor 1 210 may be operable to monitor the voltage across $V_{in}$ and V and OV monitor 2 220 may be operable to monitor the voltage across $V_{out}$ and V. In this manner, OV monitor 1 210 and OV monitor 2 220 may monitor the voltages across respective switches 1 and 2, 252, 254. In use and operation, OV monitor 1 210 may include functionality corresponding to a voltage divider triggered monitor whereas OV monitor 2 220 may include functionality corresponding to polarity change triggered monitor.

A resistor 270 may be coupled across switches 1 and 2 252, 254. The resistor 2790 may be used to limit the current flow towards the equipment during surge conditions. During normal operation (i.e., in the absence of surge conditions), switches 1 and 2 252, 254 are closed allowing normal current to be conducted between $V_{in}$ and $V_{out}$, via the inductance 240. As such, as long as switches 1 and 2 252, 254 remain closed, the resistor 270 is bypassed.

A bi-directional power voltage limiter (BDVL) 260 may be connected across the output terminals $V_{out}$ and RTN. The BDVL may restrain the overvoltage to a predefined voltage level that is less than the withstand voltage of the equipment to be protected.

Figure 6:
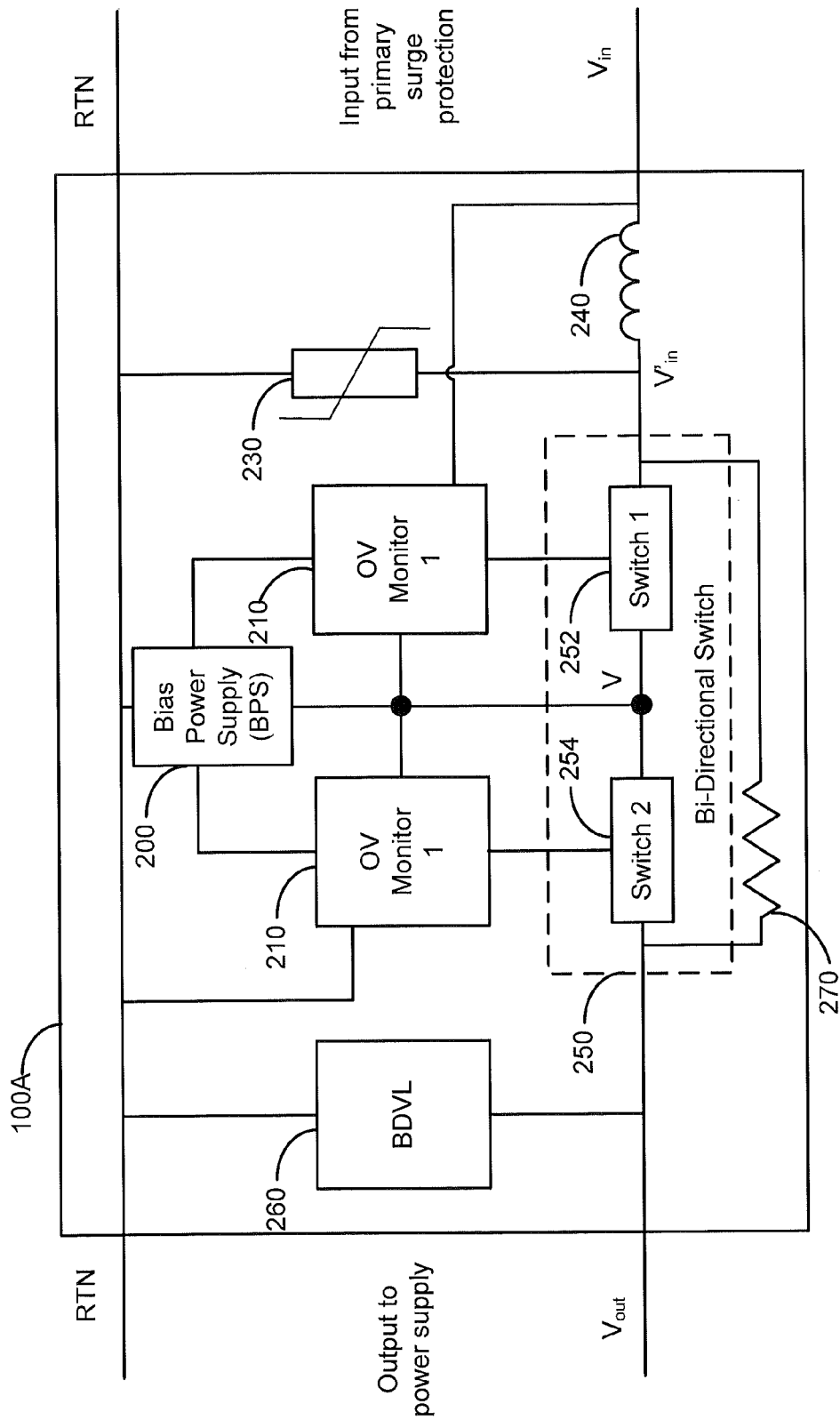
FIG. 6 is a block diagram illustrating a surge voltage limiter configured for a base installation according to some other embodiments of the present invention.

Brief reference is made to FIG. 6, which is a block diagram illustrating a surge voltage limiter configured for a base installation according to some other embodiments of the present invention. In contrast with embodiments of the SLV 100A described in FIG. 5, the SLV 100A illustrated in FIG. 6 includes two OV monitor 1 circuits 210 and no OV monitor 2 220 circuits. In this regard, the OV monitor 1 that is coupled to switch 2 254 monitors the voltage across RTN and V.

Figure 7:
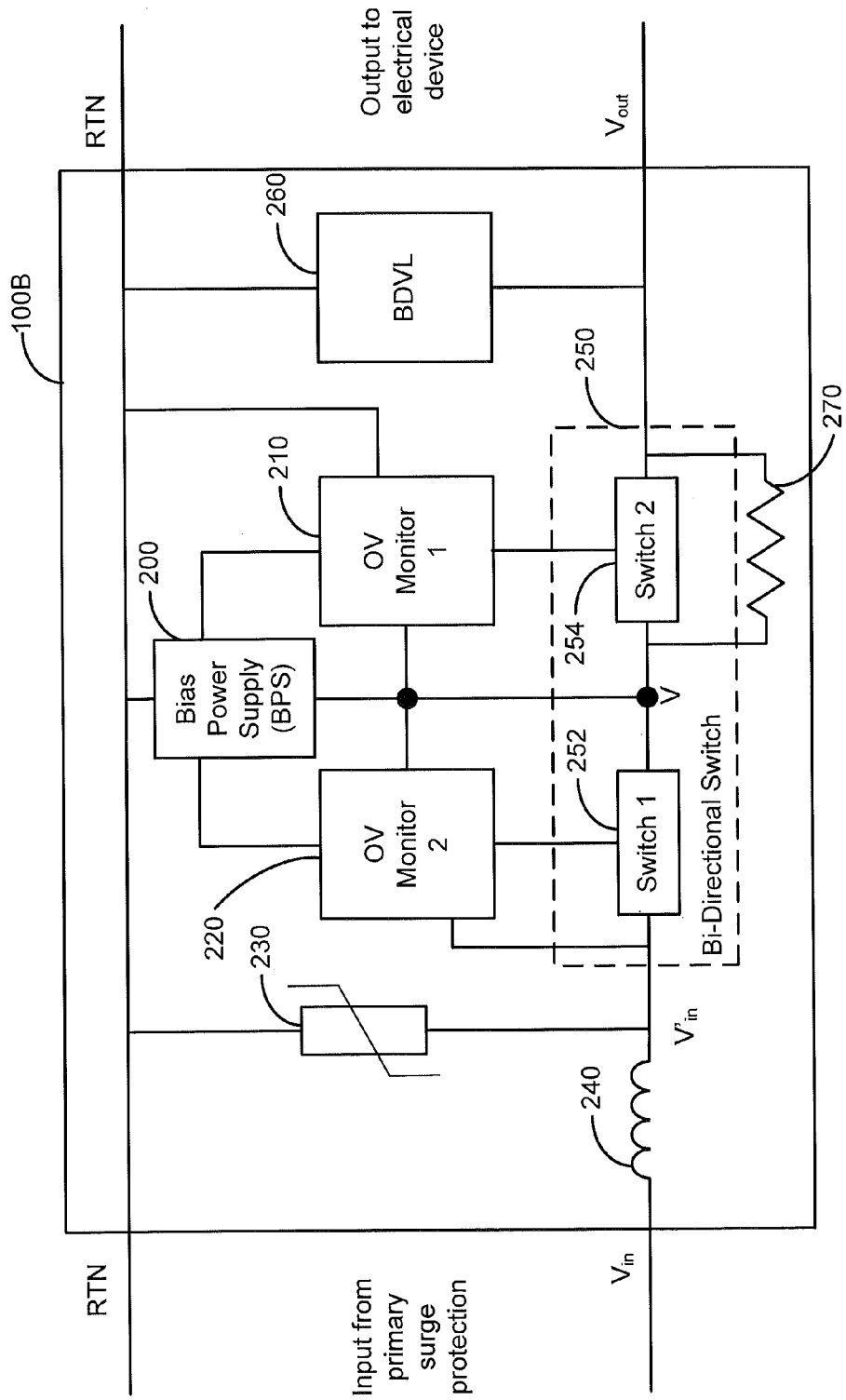
FIG. 7 is a block diagram illustrating a surge voltage limiter configured for a tower installation according to some embodiments of the present invention.

Brief reference is made to FIG. 7, which is a block diagram illustrating a SVL 100B configured for a tower installation according to some embodiments of the present invention. The above described elements of the SVL 100A configured for a base installation apply to the description of the SVL 100B configured for a tower installation except that the output terminals $V_{out}$ and RTN are for connecting to the electrical device instead of a power supply as described above. As illustrated, OV monitor 1 210 may be operable to monitor the voltage across RTN and V and OV monitor 2 220 may be operable to monitor the voltage across $V'_{in}$ and V. In this manner, OV monitor 2 220 may monitor the voltages across switch 1 252. As such, description of the same elements will be omitted.

In use and operation, when a surge current flows though the DC power cable to the electrical device at the top of the tower (or the power supply at the base of the tower) the primary surge protection 12A (See FIG. 4) absorbs the bulk of the surge current. Part of the surge current will flow through the inductance 240 to the secondary surge protection 230. The residual voltage of the secondary surge protection 230 may have a square waveform of peak value 5-8 times the nominal operating voltage of the system. The bi-directional voltage limiter (BDVL) may reduce the voltage seen by the equipment to a predefined level below a withstand voltage of the equipment. Some embodiments provide that the surge voltage limiter may operate for both polarities of the surge/lightning current. During a negative surge event switch 2 254 opens while electrical device remains powered through the resistor 270 that limits the surge current flow to the equipment to acceptable levels. During a positive surge event switch 1 252 may open thus disconnecting the electrical device from power because in some cases the equipment may not be able to withstand any level of positive overvoltages. In this manner, damage of the electrical device may be prevented if it is unable to sustain any positive overvoltage.

Figure 8:
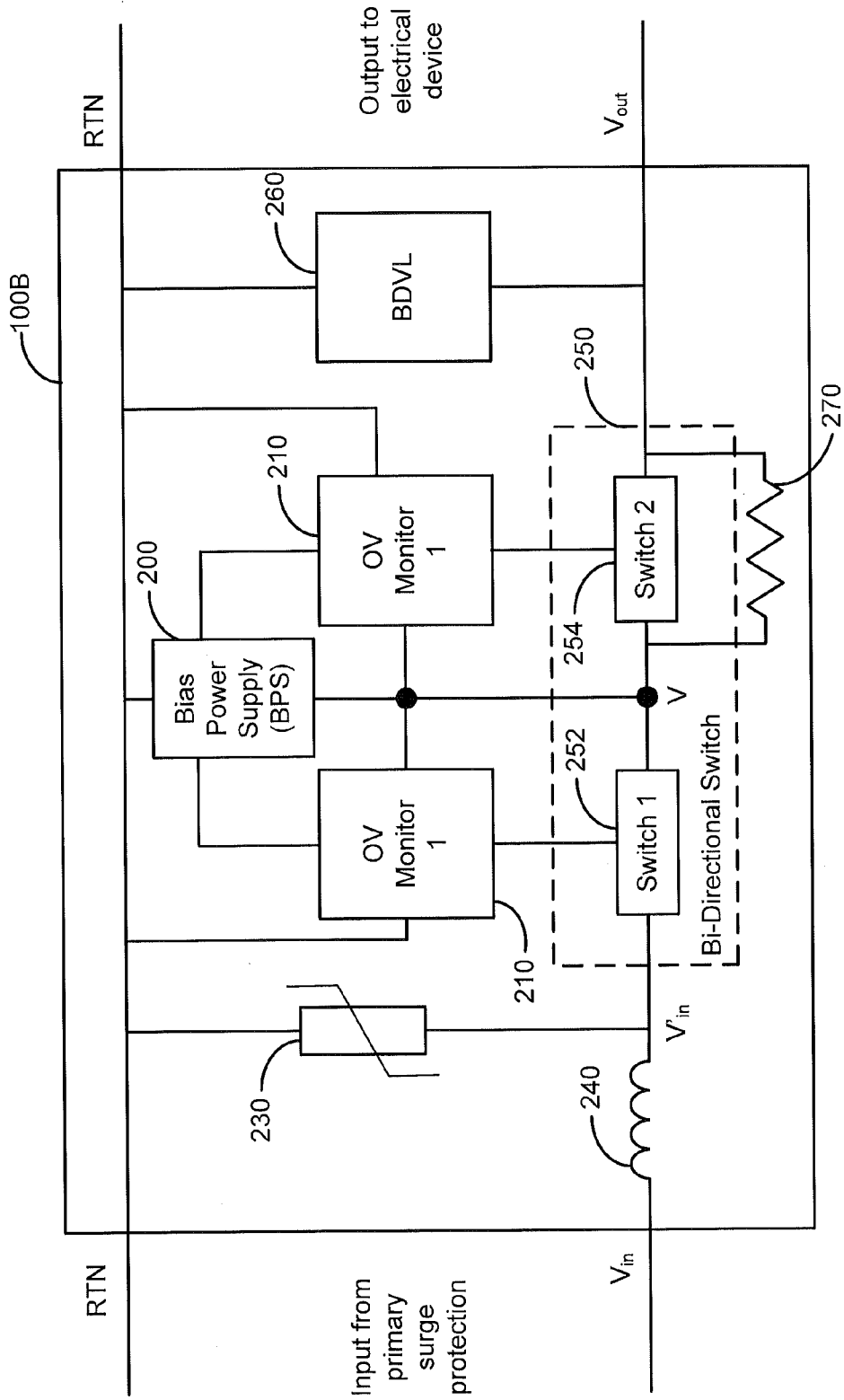
FIG. 8 is a block diagram illustrating a surge voltage limiter configured for a tower installation according to some other embodiments of the present invention.

Brief reference is made to FIG. 8, which is a block diagram illustrating a SVL 100B configured for a tower installation according to some other embodiments of the present invention. In contrast with embodiments of the SLV 100B described in FIG. 7, the SLV 100B illustrated in FIG. 8 includes two OV monitor 1 circuits 210 and no OV monitor 2 220 circuits. In this regard, the OV monitor 1 210 that is coupled to switch 2 254 monitors the voltage across RTN and V.

Figure 9:
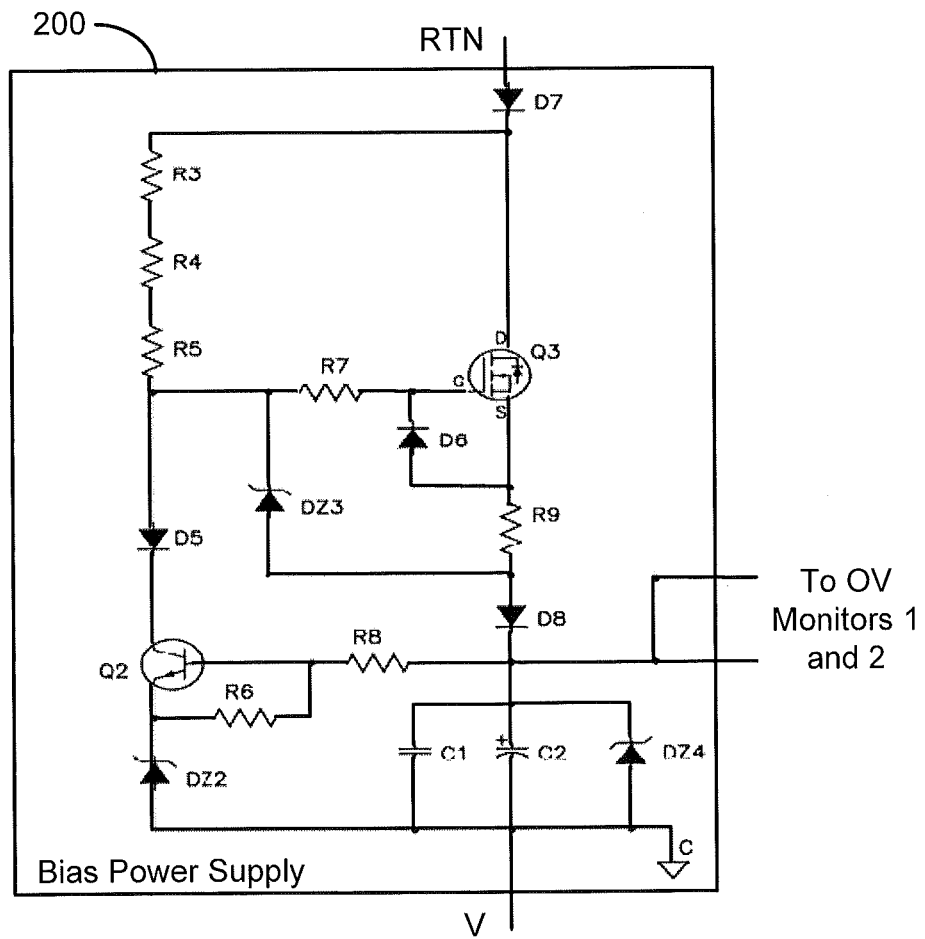
FIG. 9 is a schematic diagram representing a circuit including a bias power supply in a surge voltage limiter as illustrated in FIGS. 5-8.

Reference is now made to FIG. 9, which is a schematic diagram representing a circuit including a bias power supply in a SVL 100A, 100B as illustrated in FIGS. 5 and 6. The BPS 200 includes input terminals RTN and V and output terminals to OV monitors 1 and 2 210, 220. The voltage at the output terminals may be a substantially constant voltage power supply for the drivers in OV monitors 1 and 2 210, 220. Embodiments as illustrated in FIG. 7 are configured for a negative DC voltage V, however, such examples are non-limiting. In use and operation, current flows through the forward biased diode D7 and a voltage difference between the gate (G) and source (S) of transistor Q3 is developed using resistors R3, R4, R5 and R7. Although illustrated as a MOSFET, transistor Q3 and other transistors described herein may include any of a variety of transistors including field effect transistors, bipolar junction transistors, and/or other semiconductor switching devices.

The voltage difference across the gate (G) and source (S) of transistor Q3 turns on transistor Q3 allowing current to flow from the drain (D) to the source (S) of transistor Q3. The current then flows through the resistance R9 and diode D8, charging the capacitors C1 and C2. Resistor R9 and zener diode DZ3 may limit the current that flows through transistor Q3.

As the capacitor C2 charges, the voltage across it increases and resistors R8 and R6 bias zener diode DZ2. Transistor Q2 turns on due to the voltage difference between base (B) and emitter (E), which controls the gate voltage drive of transistor Q3. By using the closed loop feedback, the output voltage may be regulated to a desired level.

Some embodiments provide that if transistor Q2 fails to regulate the output voltage, a zener diode DZ4, which may be connected in parallel to capacitors C1 and C2, may limit the output voltage at a specified level. In some embodiments, capacitor C2 may be an electrolytic capacitor and capacitor C1 may be a ceramic capacitor having a lower capacitance than C2.

Figure 10:
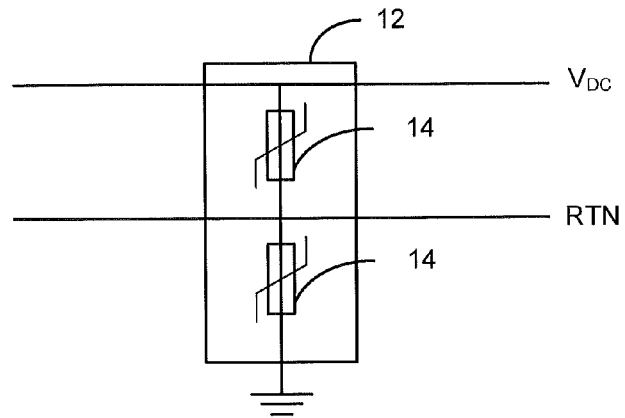
FIG. 10 is a schematic diagram representing a circuit including a primary surge protector in an overvoltage protection device according to some embodiments of the present invention.

Brief reference is now made to FIG. 10, which is a schematic diagram representing a circuit including a primary surge protector in an overvoltage protection device according to some embodiments of the present invention. A primary surge protector 12 may include one or more varistors 14 that may shunt current generated by high transient voltages. In some embodiments, a varistor 14 may include a metal oxide varistor (MOV) that has a high resistance at low voltages and a low resistance at high voltages.

Figure 11:
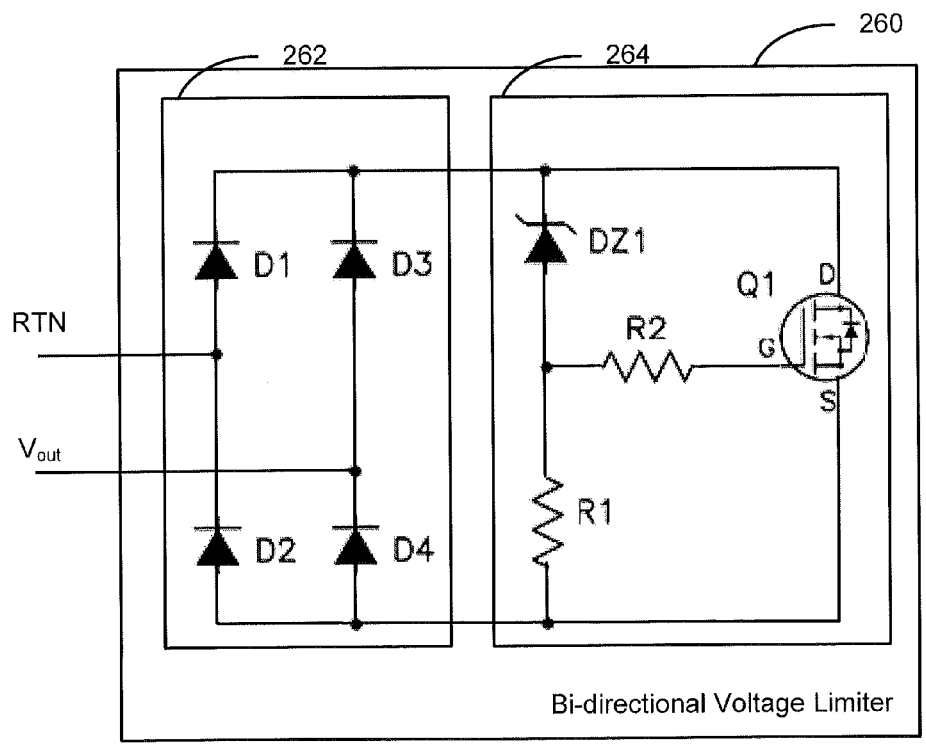
FIG. 11 is a schematic diagram representing a circuit including a bi-directional power voltage limiter in a surge voltage limiter as illustrated in FIGS. 5-8.

Reference is now made to FIG. 11, is a schematic diagram representing a circuit including a bi-directional voltage limiter in a surge voltage limiter as illustrated in FIGS. 5 and 6. The bi-directional voltage limiter (BDVL) 260 may include a power voltage limiter 264 and a bridge rectifier 262. The power voltage limiter circuit 264 may include a zener diode DZ1, a transistor (Q1) and resistors R1 and R2. Although illustrated as a MOSFET, transistors Q1 and other transistors described herein may include any of a variety of transistors including field effect transistors, bipolar junction transistors, and/or other semiconductor switching devices. The bridge rectifier 262 may include diodes D1, D2, D3, D4, and may enables the power voltage limiter 264 to function under positive and negative overvoltages.

In use and operation, the BDVL 260 may be connected to the output terminals of the SVL 100A, 100B (terminals $V_{out}$ and RTN). Under steady state conditions the zener diode DZ1 and consequently the transistor Q1 is off (i.e., in a nonconducting state between the drain and source terminals). Once an overvoltage exceeds the breakdown voltage of zener diode DZ1, DZ1 turns on and a voltage difference is developed between gate (G) and source (S) of transistor Q1, which causes the transistor Q1 to conduct current when voltage exceeds the threshold voltage. In this manner, the applied voltage is regulated.

The bridge rectifier 262 enables the power voltage limiter to function under both positive and negative overvoltages in the following manner. In the case of a positive overvoltage, the current flows through diode D3, the power voltage limiter 264 and diode D2. In the case of a negative overvoltage, the current flows though diode D1, power voltage limiter 264 and diode D4.

Figure 12:
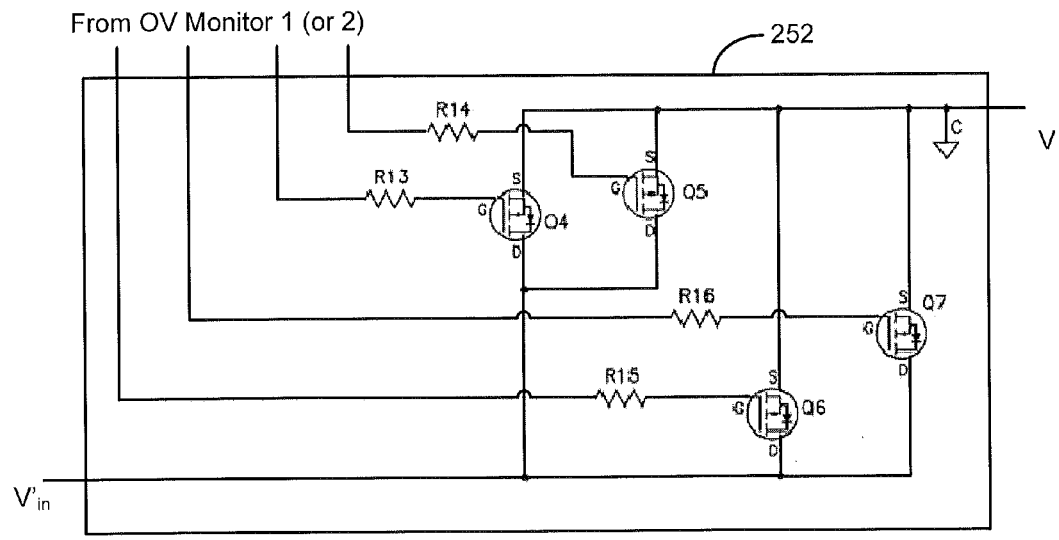
FIGS. 12 and 13 are schematic diagrams representing switches 1 and 2, respectively, in a bidirectional switch in a surge voltage limiter as illustrated in FIGS. 5-8.
Figure 13:
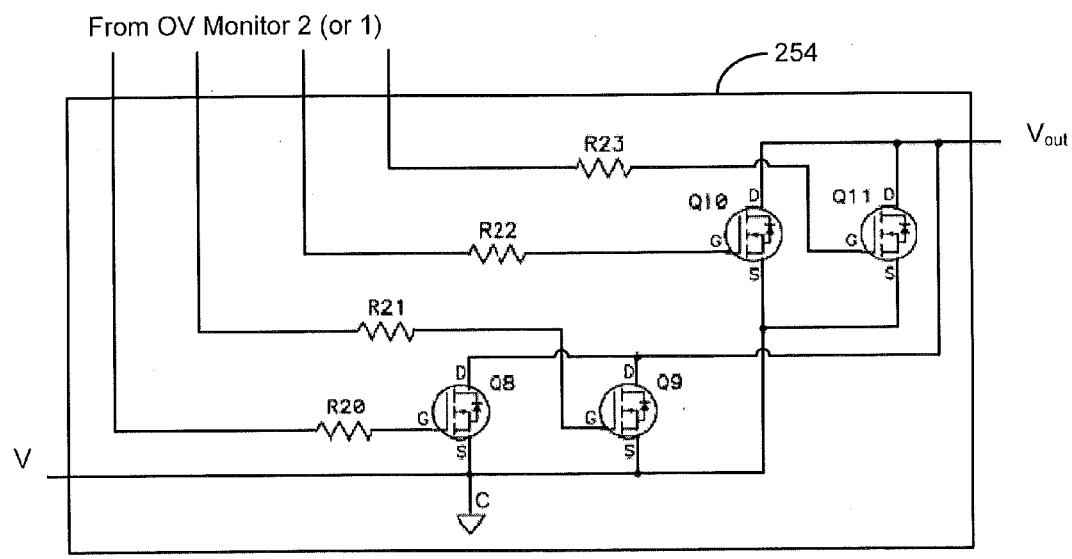

Reference is now made to FIGS. 12 and 13, which are schematic diagrams representing switches 1 and 2, respectively, in a bidirectional switch 250 in a surge voltage limiter as illustrated in FIGS. 5-8. Reference is first made to FIG. 12, which is a schematic diagram corresponding to switch 1 252 according to some embodiments. As illustrated, switch 1 252 may include four transistors Q4, Q5, Q6 and Q7 connected in parallel. As disclosed above, the transistors may include any of a number of different semiconductor switch technologies, including field effect transistors and/or bipolar junction transistors, among others. For example, Q4, Q5, Q6 and Q7 may include MOSFETS according to some embodiments. Additionally, although illustrated as including four transistors connected in parallel, some embodiments may include more or less than four transistors connected in parallel. Some embodiments may include a single semiconductor switch in lieu of the multiple parallel transistors.

Under steady state conditions the transistors Q4, Q5, Q6, and Q7 are on (i.e., conducting current from the source (S) to the drain (D)). Due to the on-resistance of the transistors, a voltage drop may be developed across the switch. By connecting the transistors Q4, Q5, Q6, and Q7 in parallel, the on-resistance may be decreased. Switch 1 252 may be controlled by OV monitor 1 210 circuit, as disclosed above regarding FIG. 5. In the present example, OV monitor 1 210 is operable to provide control inputs to the four different transistors Q4, Q5, Q6, and Q7. In case of a positive overvoltage, OV monitor 1 210 detects the overvoltage and turns transistors Q4, Q5, Q6 and Q7 off. In this manner, the electrical device or power supply, which is connected to the output terminals RTN and $V_{out}$, is disconnected from the circuit until the overvoltage ceases.

Brief reference is now made to FIG. 13, which is a schematic diagram corresponding to switch 2 254 according to some embodiments. Switch 2 254 is substantially similar structure as Switch 1 252 including four transistors Q8, Q9, Q10 and Q11. Similarly, OV monitor 2 220 is operable to provide control inputs to the four different transistors Q8, Q9, Q10, and Q11. In case of a negative overvoltage, OV monitor 2 220 detects the overvoltage and turns transistors Q8, Q9, Q10 and Q11 off. Referring to FIGS. 5 and 6, the resistor 270, which is connected across switch 2 254, is shorted by switch 2 254 under steady state conditions. When switch 2 254 turns off, the current flows through resistor 270 and is shared between the BDVL 260 and the equipment to be protected. By selecting properly the value of resistor 270, the current flowing to the equipment connected to the SVL output terminals may be limited.

Figure 14:
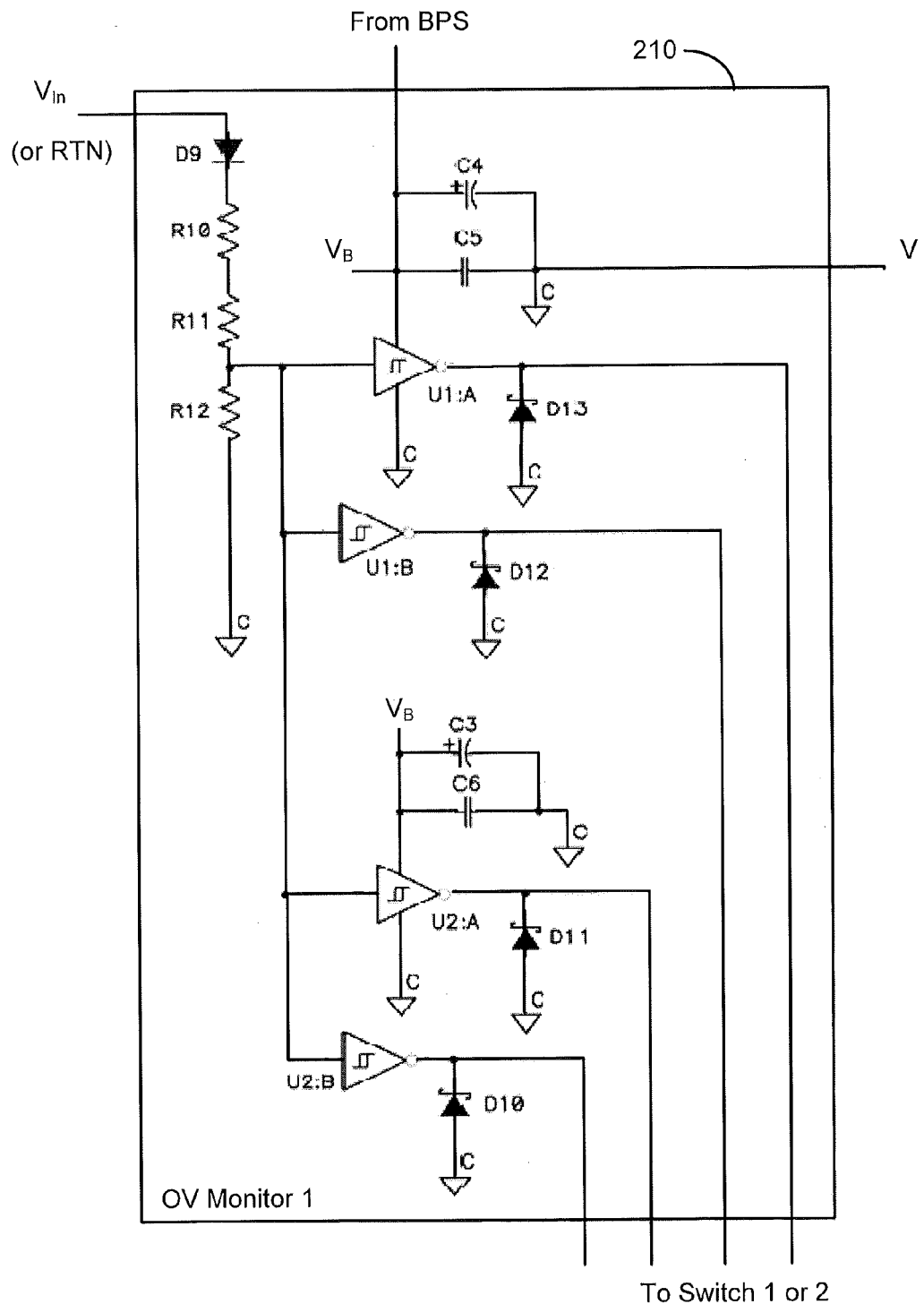
FIG. 14 is a schematic diagram representing an overvoltage monitor circuit 1 in a surge voltage limiter as illustrated in FIGS. 5-8.

Reference is now made to FIG. 14, which is a schematic diagram representing an overvoltage monitor circuit 1 210 in a surge voltage limiter as illustrated in FIGS. 5-8. As discussed above, OV monitor 1 210 may be operable to control one or more switches that may constitute switches 1 and/or 2 252, 254. For example, some embodiments provide that OV monitor 1 210 is operable to drive one or more gates of power transistors corresponding to switches 1 and/or 2 252, 254.

In some embodiments, OV monitor 1 210 may include drivers U1:A,B and U2:A,B that are operable to drive the power transistor gates of switch 1 252. Drivers U1:A,B and U2:A,B may include input hysteresis for fast output switching that is independent of the input transition time. In some embodiments, an undervoltage lockout with hysteresis may be included, which may prevent erratic system operation. As illustrated, the drivers U1:A,B and U2:A,B may be configured as dual device drivers in a single device. However, such configuration is by way of example and is non-limiting. In the context of the present example in which four transistors may be switched, two dual drivers U1 and U2 may be provided. Each of the dual drivers U1 and U2 may be powered from the bias power supply (BPS) at a bias voltage $V_B$.

Some embodiments provide that all of the transistor drivers may be in a single device and/or that each of the transistor drivers may be in a separate device. The output terminals of the OV monitor 1 210 may be electrically coupled to switches in switch 1 252. For optimum drive performance dual power supply bypass capacitors C3, C4, C5, and C6 are used. Output Shottky diodes D10, D11, D12, and D13 may be used to eliminate oscillations caused by parasitic inductances.

In use and operation, under steady state conditions the logic inputs to the drivers U1:A,B and U2:A,B, which are powered by a voltage divider generated by resistors R10, R11 and R12, are low, output pins of drivers U1:A,B and U2:A,B are high. In this manner, the transistors in switch 1 252 are on. In case of a positive overvoltage at $V_{in}$, the inputs to the drivers U1:A,B and U2:A,B become high and the output pins of drivers U1:A,B and U2:A,B, which drive the gate of the transistors Q4, Q5, Q6 and Q7 of switch 1 252 become low. In this manner, switch 1 252 is turned off.

Figure 15:
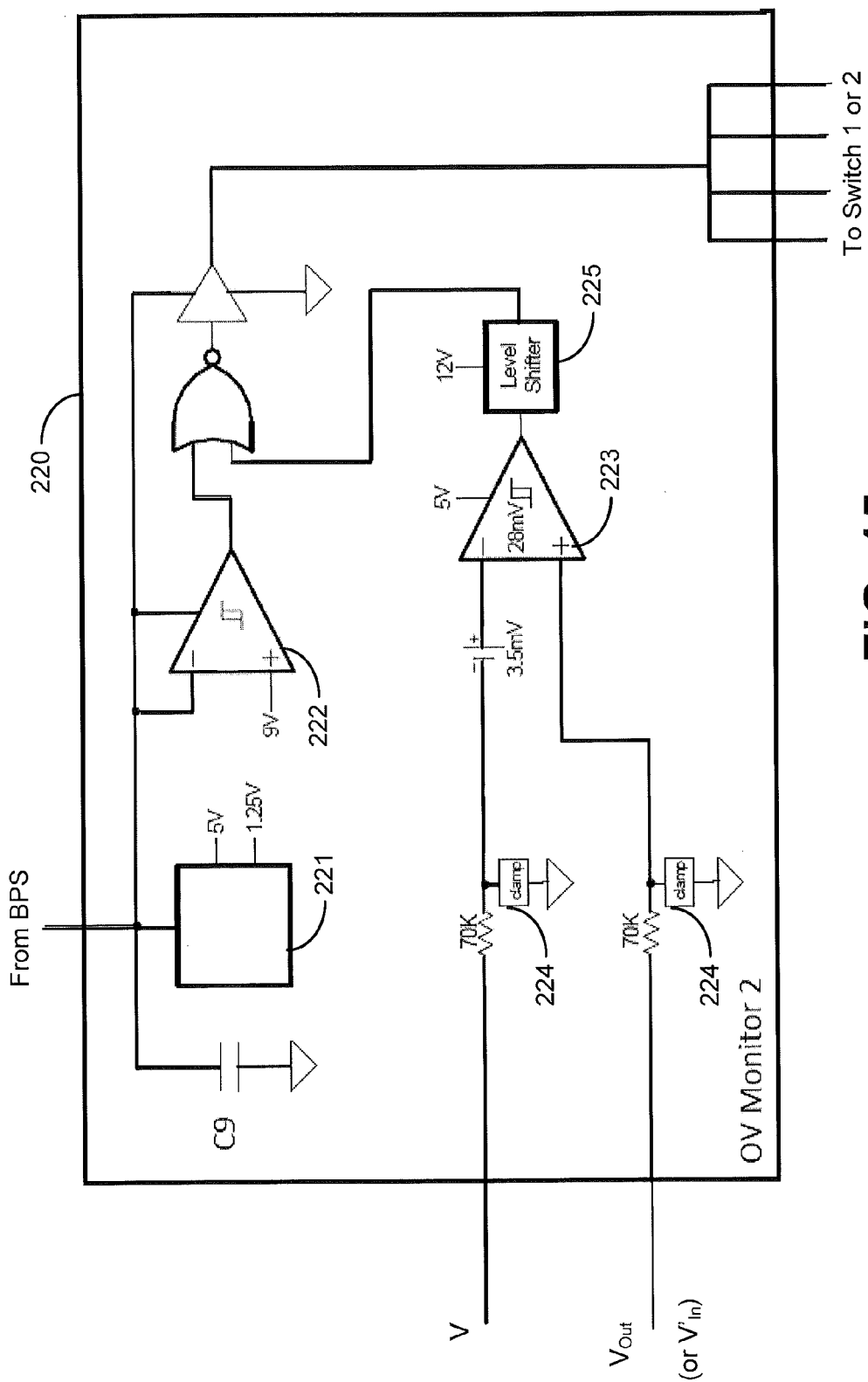
FIG. 15 is a schematic diagram representing an overvoltage monitor circuit 2 in a surge voltage limiter as illustrated in FIGS. 5 and 7.

Reference is now made to FIG. 15, which corresponds to OV monitor 2 220. OV monitor 2 220 is operable to control one or more switches that may constitute switches 1 and/or 2 252, 254. For example, some embodiments provide that OV monitor 2 220 is operable to drive one or more gates of power transistors corresponding to switches 1 and/or 2 252, 254. In some embodiments, OV monitor 2, 220 may operate to trigger switches 1 and/or 2 252, 254, based on the polarity of the voltage between points Vout and V (for switch 2) or V'in and V (for switch 1). Some embodiments provide that OV monitor 2 220 may include an integrated circuit chip, however, such embodiments are non-limiting.

In use and operation, the OV monitor 2 220 may receive power from BPS 200. In some embodiments, OV monitor 2 220 may include a voltage regulator 221 that is operable to provide internally regulated voltages, such as, for example, 5V and 1.25V, among others. An input voltage monitor 222 may cause a triggering operation of the OV monitor 2 220 when the supply voltage (Vcc) exceeds a reference voltage, such as, for example, 9V. In some embodiments, a supply voltage pin may be by-passed with a ceramic capacitor to a Gnd pin.

The two input voltage points (e.g., V and $V_{out}$) may be inputs to an internal high speed comparator 223. Some embodiments provide that both input voltage nodes may include onboard voltage clamps 224 and current limiting resistors. In some embodiments, the current limiting resistors may be about 70 kOhm each, however the resistor values are provided by way of example only. The resistors may provide a reduction of current that will be flowing to the high speed comparator 223 in case of unexpected high voltage at the input voltage points. The voltage difference across the input voltage points (e.g., V and $V_{out}$) may determine the state of the output of the high speed comparator 223. For example, some embodiments provide that if the voltage difference is more than 28 mV then the output will be pulled high (5V), if it is less than 28 mV, then its output will be low (OV).

A level shifter 225 may receive the output of the high speed comparator 223 and provide a shifting operation to a 12V level of operation.

In some embodiments, an offset voltage of the internal high speed comparator 223 may be centered around negative 3.5 mV, and may typically be less than 0 mV. The asymmetrical offset may provide that once a driven MOSFET used in the corresponding switch is conducting a current of opposite polarity, the current must actually reverse the direction (caused by a surge event of opposite direction than the load current flow) before the high speed comparator 223 will switch off the corresponding MOSFETs of the switch. The asymmetrical offset voltage may reduce or prevent potential oscillations at light load currents that may otherwise occur if the offset voltage was centered around 0 mV (as is the case in standard comparators).

Figure 16:
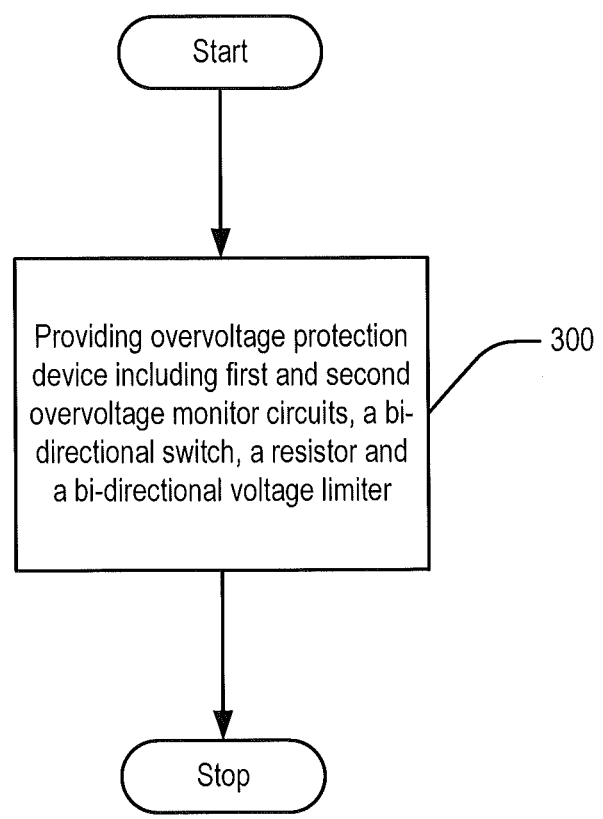
FIG. 16 is a block diagram illustrating operations corresponding to systems, methods and apparatus for providing overvoltage protection according to some embodiments of the present invention.

Reference is now made to FIG. 16, which is a block diagram illustrating operations corresponding to systems, methods and apparatus for providing overvoltage protection according to some embodiments of the present invention. Some embodiments of the method include providing an overvoltage protection device including first and second overvoltage monitor circuits, a bi-directional switch, a resistor and a bi-directional voltage limiter (block 300). The first overvoltage monitor circuit may be operable to monitor a power supply circuit to detect a positive overvoltage condition on the power supply circuit and to change a first overvoltage output responsive to the positive overvoltage condition on the power supply circuit. In some embodiments, the power supply circuit includes a power cable that is operable to transmit electrical power from a power supply to an electrical load device. The electrical load device may include any device that is operable to operate, at least in part, using electrical energy delivered via the power cable. The power cable may include an AC and/or DC power cable.

Some embodiments provide that the second overvoltage monitor circuit may be operable to monitor the power supply circuit to detect a negative overvoltage condition on the power supply circuit and to change a second overvoltage output responsive to the negative overvoltage condition on the power supply circuit.

In some embodiments, the bi-directional switch includes a first and second switches arranged serially and that are closed in the absence of the overvoltage condition. The first switch may be operable to open responsive to a positive overvoltage condition on the power supply circuit and the second switch may be operable to open responsive to a negative overvoltage condition on the power supply circuit. The resistor may be electrically connected across the second switch and may be operable to conduct current when the second switch is open.

In some embodiments, the bi-directional voltage limiter is connected across output terminals of the overvoltage protection device. The bi-directional voltage limiter may include a rectifier circuit that includes inputs that are coupled to output terminals of the circuit protection device and outputs that are coupled to a power voltage limiter. The power voltage limiter may include a voltage regulator that is coupled to a semiconductor switch and a resistor.

In some embodiments, the overvoltage protection device may include bias power supply that is coupled to the power supply circuit and that is operable to generate a bias voltage for the overvoltage monitor circuit.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A circuit protection device comprising:
   an overvoltage monitor circuit that is operable to monitor a power supply circuit to detect an overvoltage condition on the power supply circuit and to change a state of an overvoltage output responsive to the overvoltage condition on the power supply circuit;
   a bi-directional switch that is operable to interrupt or limit current flow though the power supply circuit responsive to the change in the state of the overvoltage output; and
   a bi-directional voltage limiter that is connected across output terminals of the circuit protection device and that is operable to limit an overvoltage to a predefined voltage limit,
   wherein the overvoltage monitor circuit comprises:
   a first overvoltage monitor circuit that comprises a first plurality of components and that is operable to monitor the power supply circuit to detect a positive overvoltage condition on the power supply circuit and to change a first overvoltage output responsive to the positive overvoltage condition on the power supply circuit; and
   a second overvoltage monitor circuit that comprises a second plurality of components and that is operable to monitor the power supply circuit to detect a negative overvoltage condition on the power supply circuit and to change a second overvoltage output responsive to the negative overvoltage condition on the power supply circuit,
   wherein the first plurality of components of the first overvoltage monitor circuit comprises:
   at least one driver that is operable to drive a gate of at least one transistor in the bi-directional switch;
   a voltage divider that is coupled to an input of the at least one driver; and
   a Schottky diode that is coupled to the at least one driver, and
   wherein the second plurality of components of the second overvoltage monitor circuit comprises:
   an internal voltage regulator that is operable to generate one or more internal voltages; and
   a comparator that includes an output having a state that is determined responsive to a voltage difference across input voltage points,
   wherein the first plurality of components is different than the second plurality of components.

2. The device according to claim 1, wherein the bi-directional switch comprises:
   a first switch that is closed in the absence of the overvoltage condition and that is operable to change to open responsive to a positive overvoltage condition; and
   a second switch that is in series with the first switch and that is closed in the absence of the overvoltage condition and that is operable to change to open responsive to a negative overvoltage condition.

3. The device according to claim 2,
   wherein the first switch comprises a plurality of solid state switches that are arranged in parallel with one another,
   wherein the second switch comprises a plurality of solid state switches that are arranged in parallel with one another, and
   wherein the overvoltage monitor circuit that is operable to monitor a voltage across at least one of the first switch or the second switch.

4. The device according to claim 2, further comprising a resistor that is electrically connected across the first switch and/or the second switch, the resistor operable to conduct current when either of the first switch or the second switch is open.

5. The device according to claim 2,
   wherein the first switch is operable to open responsive to the first overvoltage output from the first overvoltage monitor circuit, and
   wherein the second switch is operable to open responsive to the second overvoltage output from the second overvoltage monitor circuit.

6. The device according to claim 5, wherein the first overvoltage monitor circuit comprises:
   a voltage input circuit that is operable to receive a voltage input signal and to generate a first translated voltage signal that is a function of the voltage input signal; and
   at least one transistor driver circuit that is operable to receive a voltage reference and the first translated voltage signal and to change the first overvoltage output responsive to a comparison of the first translated voltage signal to the voltage reference, and
   wherein the second overvoltage monitor circuit comprises:

a voltage input circuit that is operable to receive the voltage input signal and to generate a second translated voltage signal that is a function of the voltage input signal; and at least one transistor driver circuit that is operable to receive the voltage reference and the second translated voltage signal and to change the second overvoltage output responsive to a comparison of the second translated voltage signal to the voltage reference.

7. The device according to claim 1, further comprising a bias power supply that is coupled to the power supply circuit and that is operable to generate a bias voltage for the overvoltage monitor circuit.

8. The device according to claim 1, wherein the bi-directional voltage limiter comprises:

a rectifier circuit that includes inputs that are coupled to output terminals of the circuit protection device and outputs that are coupled to a power voltage limiter, the power voltage limiter including a voltage regulator that is coupled to a semiconductor switch and a resistor, wherein the voltage regulator is operable to cause the semiconductor switch to conduct current when an input voltage at the output terminals of the rectifier circuit exceed a regulated voltage corresponding to the predefined voltage limit.

9. The device according to claim 1
wherein the device is coupled to a primary surge protector, the device further comprising:

a secondary surge protector that includes a first terminal that is coupled to a first input terminal of the circuit protection device; and an inductor that includes a first terminal that is connected to a second terminal of the circuit protection device, wherein a second terminal of the secondary surge protector is coupled to a second terminal of the inductor.

10. The device according to claim 1, further comprising first and second inputs that are coupled to outputs from a primary surge protector.

11. The device according to claim 1,
wherein the circuit protection device comprises an overvoltage protector configured between a power supply and a tower mounted device, and wherein the overvoltage protector further comprising a primary surge protector that is electrically coupled to a power cable that is between a tower mounted electrical device and the power supply.

12. The device according to claim 11,
wherein the overvoltage protector comprises a base overvoltage protector that is electrically coupled between the power supply and the power cable, and wherein the primary surge protector is electrically coupled between the power cable and the power supply.

13. The device according to claim 11,
wherein the overvoltage protector comprises a tower mounted overvoltage protector that is electrically coupled between the power cable and the tower mounted electrical device.

14. The device according to claim 11, wherein the primary surge protector comprises a metal oxide varistor.

15. A method for providing overvoltage protection, the method comprising:

providing an overvoltage protection device including:

a first overvoltage monitor circuit that comprises a first plurality of components and that is operable to monitor a power supply circuit to detect a positive overvoltage condition on the power supply circuit and to change a first overvoltage output responsive to the positive overvoltage condition on the power supply circuit;

a second overvoltage monitor circuit that comprises a second plurality of components and that is operable to monitor the power supply circuit to detect a negative overvoltage condition on the power supply circuit and to change a second overvoltage output responsive to the negative overvoltage condition on the power supply circuit;

a bi-directional switch that includes a first switch that is closed in the absence of the overvoltage condition and that is operable to change to open responsive to a positive overvoltage condition and a second switch that is in series with the first switch and that is closed in the absence of the overvoltage condition and that is operable to change to open responsive to a negative overvoltage condition;

a resistor that is electrically connected across either the first switch and the second switch or the second switch, the resistor operable to conduct current either when the first and the second switch or the second switch, respectively, is open; and a bi-directional voltage limiter that is connected across output terminals of the overvoltage protection device and that comprises a rectifier circuit that includes inputs that are coupled to output terminals of the circuit protection device and outputs that are coupled to a power voltage limiter, the power voltage limiter including a voltage regulator that is coupled to a semiconductor switch and a resistor, wherein the first plurality of components is different than the second plurality of components.

16. The method of claim 15, wherein providing the overvoltage protection device further comprises providing overvoltage protection device including a bias power supply that is coupled to the power supply circuit and that is operable to generate a bias voltage for the overvoltage monitor circuit.

17. An overvoltage protection device comprising:

a first overvoltage monitor circuit that comprises a first plurality of components and that is operable to monitor a power supply circuit to detect a positive overvoltage condition on the power supply circuit and to change a first overvoltage output responsive to the positive overvoltage condition on the power supply circuit;

a second overvoltage monitor circuit that comprises a second plurality of components and that is operable to monitor the power supply circuit to detect a negative overvoltage condition on the power supply circuit and to change a second overvoltage output responsive to the negative overvoltage condition on the power supply circuit;

a bi-directional switch that includes a first switch that is closed in the absence of the overvoltage condition and that is operable to change to open responsive to a positive overvoltage condition and a second switch that is in series with the first switch and that is closed in the absence of the overvoltage condition and that is operable to change to open responsive to a negative overvoltage condition;

a resistor that is electrically connected across either the first switch and/or the second switch or the second switch, the resistor operable to conduct current either when the first and the second switch or the second switch, respectively, is open; and a bi-directional voltage limiter that is connected across output terminals of the overvoltage protection device and that comprises a rectifier circuit that includes inputs that are coupled to output terminals of the circuit protection device and outputs that are coupled to a power voltage limiter, the power voltage limiter including a voltage regulator that is coupled to a semiconductor switch and a resistor, wherein the first plurality of components is different than the second plurality of components.

18. The device according to claim 17, wherein the device is coupled to a primary surge protector, the device further comprising:

a secondary surge protector that includes a first terminal that is coupled to a first input terminal of the overvoltage protection device; and an inductor that includes a first terminal that is connected to a second input terminal of the overvoltage protection device, wherein a second terminal of the secondary surge protector is coupled to a second terminal of the inductor.

19. The device according to claim 18, wherein the first and second input terminals of the overvoltage protection are connected to the primary surge protector that is electrically coupled to a power cable.

* * * * *